(12) United States Patent
Plowman et al.

(10) Patent No.: US 10,089,782 B2
(45) Date of Patent: Oct. 2, 2018

(54) GENERATING POLYGON VERTICES USING SURFACE RELIEF INFORMATION

(71) Applicant: ARM Limited, Cambridge (GB)

(72) Inventors: Edward Plowman, Cambridge (GB); Sean Ellis, Cambridge (GB)

(73) Assignee: Arm Limited, Cambridge (GB)

( * ) Notice: Subject to any disclaimer, the term of this patent is extended or adjusted under 35 U.S.C. 154(b) by 128 days.

(21) Appl. No.: 14/717,850

(22) Filed: May 20, 2015

(65) Prior Publication Data

US 2015/0339852 A1    Nov. 26, 2015

(30) Foreign Application Priority Data

May 23, 2014    (GB) .................................. 1409193.8

(51) Int. Cl.
| | |
|---|---|
| *G06T 15/30* | (2011.01) |
| *G06T 17/20* | (2006.01) |
| *G06T 15/00* | (2011.01) |
| *G06T 15/80* | (2011.01) |

(52) U.S. Cl.
CPC ............ *G06T 17/20* (2013.01); *G06T 15/005* (2013.01); *G06T 15/80* (2013.01); *G06T 2210/36* (2013.01); *G06T 2215/12* (2013.01)

(58) Field of Classification Search
None
See application file for complete search history.

(56) References Cited

U.S. PATENT DOCUMENTS

| | | | | |
|---|---|---|---|---|
| 5,644,406 A | * | 7/1997 | Harrington | G06T 9/005 382/239 |
| 6,130,673 A | * | 10/2000 | Pulli | G06T 17/30 345/423 |
| 6,256,038 B1 | * | 7/2001 | Krishnamurthy | G06T 11/203 345/419 |
| 7,133,044 B2 | * | 11/2006 | Maillot | G06T 17/20 345/419 |
| 8,243,064 B1 | * | 8/2012 | Moravanszky | G06F 17/5009 345/419 |

(Continued)

FOREIGN PATENT DOCUMENTS

GB    2491687 A    12/2012

OTHER PUBLICATIONS

European Search Report dated Nov. 24, 2014, GB Patent Application No. GB1409193.8.

*Primary Examiner* — Anh-Tuan V Nguyen
(74) *Attorney, Agent, or Firm* — Vierra Magen Marcus LLP (57) ABSTRACT

When rendering a region of a three-dimensional object represented by a base set of polygon vertices in a graphics processing pipeline, a first processing stage uses meta-information representative of the surface relief of the region of the three-dimensional object to determine whether to generate a set of additional polygon vertices over the region of the three-dimensional object, and generates the additional set of polygon vertices (when this is deemed necessary). A second processing stage then uses information representative of the surface relief of the region of the three-dimensional object to modify the positions of one or more of the polygon vertices, before the vertices are assembled into primitives that are then rasterised and rendered.

14 Claims, 4 Drawing Sheets

(56) References Cited

U.S. PATENT DOCUMENTS

| | | | | |
|---|---|---|---|---|
| 8,345,004 B1* | 1/2013 | Kass | G06T 13/20 | 345/161 |
| 8,436,855 B1* | 5/2013 | Morgan | G06T 15/80 | 345/419 |
| 8,605,085 B1* | 12/2013 | Moreton | G06T 17/20 | 345/419 |
| 8,704,792 B1* | 4/2014 | Kataoka | G06F 3/0416 | 345/173 |
| 9,189,883 B1* | 11/2015 | Hecht | G06T 15/08 | |
| 2002/0190988 A1* | 12/2002 | Maillot | G06T 17/20 | 345/428 |
| 2004/0012563 A1* | 1/2004 | Papakipos | G06T 1/20 | 345/157 |
| 2004/0196285 A1* | 10/2004 | Rice | G06T 17/20 | 345/423 |
| 2007/0182734 A1* | 8/2007 | Levanon | G06T 17/005 | 345/420 |
| 2007/0195083 A1* | 8/2007 | Yoo | G06T 15/04 | 345/420 |
| 2008/0019609 A1* | 1/2008 | Hamilton | G01S 15/8977 | 382/278 |
| 2008/0205791 A1* | 8/2008 | Ideses | H04N 19/597 | 382/285 |
| 2008/0225342 A1* | 9/2008 | Lin | H04N 1/32251 | 358/3.06 |
| 2009/0021522 A1* | 1/2009 | Burley | G06T 15/04 | 345/582 |
| 2009/0128560 A1* | 5/2009 | Schechter | G06T 11/001 | 345/421 |
| 2009/0195545 A1* | 8/2009 | Debevec | G06T 13/40 | 345/473 |
| 2010/0091018 A1* | 4/2010 | Tatarchuk | G06T 13/20 | 345/423 |
| 2010/0253683 A1* | 10/2010 | Munkberg | G06T 17/20 | 345/423 |
| 2011/0018874 A1* | 1/2011 | Hasselgren | G06T 15/40 | 345/420 |
| 2011/0157206 A1* | 6/2011 | Duluk, Jr. | G06T 15/04 | 345/582 |
| 2012/0182298 A1* | 7/2012 | Sun | G06T 17/005 | 345/423 |
| 2012/0229464 A1* | 9/2012 | Fishwick | G06T 17/20 | 345/423 |
| 2013/0034309 A1 | 2/2013 | Nystad | | |
| 2013/0202187 A1* | 8/2013 | Goren | G01N 21/9501 | 382/149 |
| 2013/0265309 A1* | 10/2013 | Goel | G06T 15/80 | 345/426 |
| 2014/0035940 A1* | 2/2014 | Dmitriev | G06T 15/04 | 345/582 |
| 2015/0221106 A1* | 8/2015 | Winnemoeller | G06F 3/01 | 345/441 |

* cited by examiner

GENERATING POLYGON VERTICES USING SURFACE RELIEF INFORMATION

BACKGROUND

The technology described herein relates to the processing of computer graphics and in particular to a method of and an apparatus for generating a set of polygon vertices for a region of a three-dimensional object.

It is common in computer graphics systems to render three-dimensional objects for display by sub-dividing the surface of each three-dimensional object into a number of similar basic components (so-called "primitives") to allow the graphics processing operations to be more easily carried out. These "primitives" are usually in the form of simple polygons, such as triangles and quadrilaterals.

The graphics primitives are usually generated by the applications program interface for the graphics processing system, using the graphics drawing instructions (requests) received from the application (e.g. game) that requires the graphics output.

Each primitive at this stage is usually defined by and represented as a set of vertices. Each vertex for a primitive has associated with it a set of data (such as position, colour, texture and other attributes data) representing the vertex. This data is then used, for example, when rasterising and rendering the vertex (the primitive(s) to which the vertex relates) in order to generate the desired output of the graphics processing system.

Once primitives and their vertices have been generated and defined, they can be processed by the graphics processing system, in order, for example, to display the object that they relate to.

One way to display the surface geometry of a three-dimensional object more accurately and therefore realistically is to increase the number of primitives and vertices used to represent the object. However, sometimes this additional information may not be needed, for example if the object is being viewed from far away or its surface is at a shallow angle to the viewer, such that finer detail in the surface geometry will not be visible in the rendered output, even if it is generated (rendered). In such circumstances, it is a waste of processing resources to process a large number of primitives representing the finer detail of the object.

It is known therefore to represent the surface geometry of objects with larger "patches", and then to tessellate additional vertices (primitives) within a patch if required in order to display a finer level of detail on the object. However, when additional vertices are tessellated they do not necessarily contain all the information regarding their position to create an accurate representation of the surface relief of the object. For example, the positions of the additional vertices could be interpolated across the patch using the limited number of vertices used to define the patch, e.g. at the corners of the patch. This works if the surface relief of the patch is flat but will not provide an accurate representation of the surface relief of the object if the patch is anything apart from flat.

An efficient way of providing the surface relief to the patch in this circumstance is to separate out, from the three-dimensional object described by the primitives and vertices within the patch, the finer details of the surface geometry into a so-called "displacement map". The displacement map contains the differences in surface relief between the primitives and the actual object to be displayed. The vertices for the patch are then "displaced" using the displacement map (e.g. by sampling the displacement map at the vertex positions) to provide the surface detail of the object being rendered across the surface of the patch.

In these arrangements, the level of tessellation of the patches representing the basic surface geometry of the object determines in how much detail the displacement map is sampled within each patch. If the level of tessellation is low, i.e. the sampling is coarse, then all the surface relief features in the displacement map will not be displayed in the output, rendered object, particularly when there is a lot of detail in the displacement map, i.e. the displacement map includes high frequency components. This can then cause a problem if, in a subsequent frame, a higher level of tessellation is used (e.g. because the object is closer to the viewer), as that will result in finer detailed sampling of the displacement map and so can result in the viewer seeing the sudden appearance of surface relief detail (or vice-versa when moving from a higher level of tessellation to a lower level of tessellation, e.g. as an object moves away from the viewer). This undesirable effect is known as "popping".

In order to reduce "popping" effects, patches are typically tessellated to a greater degree than may otherwise be necessary ("over-tessellated"). However, while this can reduce the risk of "popping", it results in more primitives and vertices needing to be processed.

The Applicants believe therefore that there remains scope for improved techniques for the use of displacement maps within graphics processing systems, particularly for use in mobile and lower-powered environments where processing capability and bandwidth are limited.

BRIEF DESCRIPTION OF THE DRAWINGS

A number of embodiments of the technology described herein will now be described, by way of example only, and with reference to the accompanying drawings, in which.

DETAILED DESCRIPTION

One embodiment of the technology described herein comprises a method of generating a set of polygon vertices over a region of a three-dimensional object in a graphics processing pipeline, the method comprising:

determining, based on meta-information representative of the surface relief of the region of the three-dimensional object, whether to generate a set of polygon vertices over the region of the three-dimensional object;

generating the set of polygon vertices over the region of the three-dimensional object, if this is determined to be required; and setting the positions of one or more vertices in the set of polygon vertices based on information representative of the surface relief of the region of the three-dimensional object.

Another embodiment of the technology described herein comprises a graphics processing pipeline, the graphics processing pipeline comprising processing circuitry operable to generate sets of polygon vertices over regions of three-dimensional objects being processed by the graphics processing pipeline, wherein the processing circuitry operable to generate sets of polygon vertices over regions of three-dimensional objects being processed by the graphics processing pipeline is configured to:

determine, based on meta-information representative of the surface relief of a region of a three-dimensional object being processed, whether to generate a set of polygon vertices over the region of the three-dimensional object;

generate the set of polygon vertices over the region of the three-dimensional object, if this is deemed to be required; and set the positions of one or more vertices in the set of polygon vertices based on information representative of the surface relief of the region of the region of the three-dimensional object.

The technology described herein relates to graphics processing pipelines in which regions (patches) representing three-dimensional objects may be tessellated to generate vertices for use when rendering the object regions (patches) (with the vertices for the object region then being displaced, e.g. using a displacement map), to provide the surface relief detail for the object region in question).

However, unlike in conventional tessellation arrangements, in the technology described herein the "tessellation" stage of the graphics processing pipeline uses meta-information (meta-data) representative of the surface relief of the three-dimensional object to be rendered, e.g. derived from a displacement map, to determine whether it is necessary to tessellate the object region (patch) more finely, i.e. whether it is necessary to create a set of vertices within the object region (patch). When the tessellation stage determines that the region needs to be tessellated (i.e. vertices are desirable to be able to more accurately represent the surface relief of the object), vertices are generated over the region.

As will be discussed further below, the Applicants have recognised that when the surface relief in a particular region of the object is complex with lots of detail to display, it will be desirable to (and, e.g., the processing circuitry does) generate vertices which can then be displaced using the information representative of the surface relief of the three-dimensional object, e.g. a displacement map, in order to display the surface detail better. Conversely, when the objection region is void of surface features (relief), the Applicants have recognised that little or even no tessellation of the object region can be used without significant adverse effect to the displayed image, and so in an embodiment of this case the processing circuitry does not generate any vertices for the object region (patch) in question, thus minimising the processing and bandwidth needed for that particular region of the object.

The technology described herein thus uses meta-information to determine the level of tessellation to be provided in a particular area of the object, i.e. over a given patch, appreciating that often the visible surface relief detail of a given object is not uniform (either owing to the inherent detail of the object, or the distance or angle of different parts of the object from the camera).

By using an appropriate level of tessellation for an object to be rendered, the problem of popping can be reduced and/or avoided, but without the need to "over-tessellate", and the benefits of using the actual displacement of the surface are afforded, e.g. correct handling of lighting and shadows.

In an embodiment the number of polygon vertices generated depends on the meta-information, i.e. the processing circuitry is arranged to determine the number of polygon vertices to be generated based on the meta-information. The processing circuitry could determine this by determining an absolute number of polygon vertices to be generated, or the density of the polygon vertices to be generated, i.e. with the absolute number depending on the area of the region over which they are generated.

The meta-information indicative of the surface relief of the object region can be any desired and suitable meta-information (meta-data) that can indicate the surface relief of the object region.

In an embodiment the meta-information is derived from the information representative of the surface relief of the (region of the) object that will be used by the processing circuitry to set the positions of the vertices of the object region.

The information representative of the surface relief of the region of the three-dimensional object can comprise any desired and suitable such information. In an embodiment it comprises a displacement map.

Displacement maps are data structures that provide, or that can be used to derive, a two-dimensional representation of the surface of a three-dimensional object, and which, e.g., indicate for a plurality of sampling positions across the object's surface an amount by which to displace the surface of the object. In an embodiment the displacement measure is indicated as a vector, e.g. (x, y, z), which details how to displace the sampling position in three dimensions, i.e. in which direction and by what distance.

Such vector displacement maps may be encoded, e.g., in world space (the coordinate system of the scene being rendered for display) or tangent space (the coordinate system based on the tangent plane and normal to the surface of the object being rendered for display). In an embodiment, however, the displacement map comprises displacement measures defined in object space (the local coordinate system of the object being rendered for display). This allows the displacement measures from the displacement map to be applied in object space, i.e. the vertices are displaced locally, and then the vertices are used for further processing of the object.

The displacement measures can, e.g., be stored for discrete sampling positions or indicated by a (continuous) function that can be used to derive the displacement for any given sampling position.

Other arrangements of representing and indicating the surface relief to be used for and applied to a region of an object (a "patch") can be used when desired.

In one embodiment the surface relief meta-information comprises information representative of the frequency components of the surface relief geometry of the region of the three-dimensional object and/or of the three-dimensional object as a whole. In an embodiment this frequency component information is derived from the information representative of the surface relief of the region, e.g. from the displacement map.

In this regard, the "frequency" of the surface relief geometry for an object will, in effect, and e.g. does, correspond to the rate of change in the surface relief from one position on the surface of the object to another position on the surface (e.g. from one sampling position to the next, and/or across a particular distance over the surface of the object) (e.g. the rate of change of surface relief from one sampling position to the next in the displacement map that is indicating the surface relief). "High frequency" components will be present where there are big changes in surface relief from one position to another across the surface, whereas when the surface relief only has low frequency components, that will correspond to there being little change from one position to another across the surface of the object (i.e. that the surface of the object is largely flat).

The Applicants have accordingly recognised that the "frequency" of the surface relief geometry of an object is dependent on (and thus indicative of) the complexity of the detail therein. Thus the frequency components of the surface relief geometry provide a useful measure of how much to tessellate across the surface being rendered, i.e. how many polygon vertices to generate over the region of the three-dimensional object. In an embodiment the number of polygon vertices generated is based on (and for example proportional to) one or more of the frequency components, e.g. the highest frequency component.

In one embodiment the meta-information comprises a single value representative of the frequency components in the surface relief of the region of the object, e.g. a value representative of the maximum frequency component. The single value could be the maximum frequency component itself or some other indicator. One example of an indicator that can be used is the number of grid points used to encode the displacement map, e.g. when the displacement map is generated or stored as discrete points across the two-dimensional surface of the displacement map.

In another embodiment, the meta-information comprises plural values, each representative of respective, different, frequency components in the surface relief of the region of the object.

The meta-information, e.g. the frequency component or components, can be determined and provided to the processing circuitry as desired. For example, where this information is already available, e.g. because of the way in which the surface relief information (e.g. displacement map) is encoded, then it can be taken appropriately (and directly) from the encoded surface relief information (e.g. displacement map).

For example, certain data encoding schemes, such as the Applicant's Adaptive Scalable Texture Compression (ASTC) scheme as described in GB-A-2491687, or ARM Frame Buffer Compression (AFBC) scheme as described in US-A1-2013/0034309, encode data in such a way that the frequency components of the encoded data can be identified from the encoded data itself.

This will then allow the surface relief meta-information to be determined from the encoded surface relief information (e.g. displacement map) directly.

Thus, in an embodiment, the surface relief information to be used for the object (and/or for the region of the object) is encoded in such a way that the frequency components of the encoded surface relief data can be identified from the encoded surface relief data itself (e.g. using one of the Applicant's ASTC or AFBC encoding schemes), and the surface relief meta-information is then determined from the encoded surface relief information.

Alternatively, the surface relief information, e.g. displacement map, could be processed to determine the meta-information, e.g. to obtain the frequency components of the displacement map. Thus, in one embodiment, the surface relief meta-information (e.g. the frequency information) is extracted from the surface relief information (e.g. displacement map), e.g. as part of the surface relief information encoding process.

In this case, the meta-information could be determined in advance, e.g. from a separate processing stage, unit or component, or the meta-information could be determined from the information indicative of the surface relief of the object (e.g. displacement map) in use, for example, by processing circuitry in the graphics processing pipeline itself, e.g. by a processing stage in the graphics processing pipeline.

Thus in one set of embodiments the method comprises the step of determining the meta-information from the information representative of the surface relief of the region of the three-dimensional object. The meta-information can then be used as described above. In an embodiment the meta-information comprises, as discussed above, one or more frequency components of the surface relief geometry of the three-dimensional object and thus in an embodiment processing circuitry is arranged to determine one or more frequency components from the information representative of the surface relief.

In the embodiments in which the meta-information comprises, or is derived from, the frequency components of the surface relief geometry of the three-dimensional object, the frequency components may be determined using a discrete cosine transform (DCT), or a wavelet transform, of the, e.g., displacement map. These are established techniques which allow a complex function to be split up into component parts such that it can be expressed, for example, as a sum of simpler functions, e.g. cosine functions.

In one embodiment the number of polygon vertices to be generated, i.e. the level of tessellation, is determined by using a single piece of meta-information, e.g. frequency component, only. This could be by virtue of the meta-information only comprising a single value, e.g. the maximum frequency component, for example, or alternatively the processing circuitry could be arranged to select a frequency component to use to determine when it is necessary to generate polygon vertices within the region of the surface of a three-dimensional object, and for example also to determine the number of polygon vertices to generate. This is a particularly simple way in which to use the meta-information and it thus minimises the processing necessary to determine the level of tessellation. In an embodiment the frequency component is selected using a band-pass filter.

In another embodiment the number of polygon vertices to be generated is determined using two or more frequency components. Although this requires more processing than using only a single frequency component, by using a combination of frequency components a more refined determination of the level of tessellation can be made.

In an embodiment, as well as the determination of whether to generate vertices and how many vertices to generate being dependent upon meta-information indicative of the surface relief of the region of the object, the determination of whether to generate polygon vertices and/or the number of polygons vertices that are generated is dependent upon one or more other factors or criteria. In this case, the determination of whether to generate vertices and the number of vertices that are generated can be based on any desired and suitable further criteria or factors, but in an embodiment it is also based on the relationship between the viewpoint (camera position) and the object being processed, and in particular on one or more of (and for example both of): the distance from the viewpoint to the object and the angle at which the object is being viewed (the viewing distance and the viewing angle).

The Applicants have recognised in this regard that when an object being displayed is far away from the camera (viewpoint), or its surface is at a shallow angle to the camera (viewpoint), then the finer detail of the surface relief will not be visible even if it is generated. Conversely, when an object being displayed is close to the camera, or its surface is square on to the camera, then the finer detail of the surface relief will be visible. It is therefore advantageous also to use the object's distance from the camera and the viewing angle of its surface to affect the determined level of tessellation, e.g. in order that the appropriate surface relief frequency components are processed and displayed, so that higher (more detailed) frequency components are not processed unnecessarily, i.e. by unnecessary tessellation.

Thus, while in one embodiment the frequency component that is used to determine the number of polygon vertices to be generated (the level of tessellation) selected is always the same frequency component, e.g. the maximum frequency component or one of a particular frequency, in an embodiment the frequency component(s) selected depends on one or more other factors, e.g. spatial variables, such as, and for example one or both of the distance from, or angle at, which the region of the surface of the three-dimensional object is being viewed in the frame being rendered.

In such an embodiment, the processing circuitry is arranged to use the meta-information to determine how the surface relief details, e.g. frequency components, depend on the one or more other factors. In this way, when the other factors change, e.g. the distance of the object being displayed from the camera changes, the relationship between the other factors and the surface relief details to be displayed for a given value of a particular factors is known such that an appropriate level of tessellation is performed.

In these arrangements, the surface relief frequency components could be introduced separately at different values of the one or more other factors, e.g. in the embodiment in which the tessellation depends only a single frequency component, different frequency components could be used to determine the level of tessellation at different distances of the object being displayed from the camera. However in an embodiment the surface relief frequency components are weighted, e.g. with the weights depending on the one or more other factors, e.g. spatial variables, such that frequency components can be introduced to affect the tessellation gradually as the one or more other factors change. This helps to avoid "popping" as frequency components in the surface relief are not suddenly introduced or do not suddenly disappear, e.g. as the camera zooms into or out from an object, or the angle at which the surface is being viewed changes.

In one embodiment a frequency-based bounding box, containing the extremities of the displacements on the region of the surface of the object, is used to determine from which angles certain frequency components are visible, and then, e.g., whether they should be used to determine the level of tessellation.

The object region (patch) being considered could correspond to (represent) the whole of the surface of the three-dimensional object.

However, in an embodiment, the region of the three-dimensional object is only a portion of the whole object, with the method being repeated for a plurality of regions (patches) which together make up the total (visible) surface area of the object.

Correspondingly, a given level of tessellation (the number of vertices generated) could be determined for the three-dimensional object as a whole. However, while this may be appropriate for some objects, e.g. with a relatively uniform surface relief, the surface relief of many objects is not uniform but has some areas which are more detailed, i.e. comprise higher frequency components, and some areas which are less detailed, i.e. comprise lower frequency components.

Thus, in an embodiment, where the object is divided into a plurality of regions (patches), a separate level of tessellation is determined for each region (patch) that the object is divided into (i.e. the tessellation for the object is determined on a region-by-region basis) (although it will be appreciated in this regard that different regions for the same object could be determined to use the same level of tessellation, where that is appropriate).

Where it is determined that polygon vertices over the region of the three-dimensional object in question should be generated, then the set of polygon vertices for the region in question can be generated and determined in any desired and suitable manner.

The (and each) region (patch) of a three-dimensional object could be defined in any desired and suitable way (and this is not constrained to a particular arrangement or topology). In an embodiment the (and for example each) region is defined as a "base" primitive, such as, a triangle, quad or isolines. In an embodiment the regions are correspondingly defined by and/or have associated with them a base set of polygon vertices (e.g. for the corners and/or along the edges of the region in question).

Where the region is not defined by a set of vertices, then the set of polygon vertices generated based on the surface relief meta-information will be the complete set of vertices for the region. Where the region is defined by and/or has associated with it a base set of vertices, then the set of polygon vertices generated based on the surface relief meta-information could replace the base set of polygon vertices (e.g. the base set of polygon vertices act as a scaffold for the generated set of polygon vertices). However, in an embodiment the set of polygon vertices generated based on the surface relief meta-information is in addition to the base set of polygon vertices.

Thus in one embodiment, the vertices to be processed (e.g. displaced) for the object region will (solely) comprise the set of polygon vertices generated based on the surface relief meta-information, and in another embodiment the vertices to be processed (e.g. displaced) for the object region comprise the set of polygon vertices generated based on the surface relief meta-information together with a further set of vertices (which further set of vertices is in an embodiment a base set of vertices for the object region in question).

In an embodiment the position of each of the vertices generated in the set of polygon vertices is interpolated from the position of a "base" set of polygon vertices (e.g. those which define the region (patch)).

Once any polygon vertices have been generated, the polygon vertices present at this stage, e.g. depending on whether a replacement or additional set of polygon vertices has been generated, are processed, e.g. by the processing circuitry of the graphics processing pipeline, to set the positions of the vertices based on the surface relief for the region of the object in question. In the embodiment in which the vertices to be processed for the region of the three-dimensional object comprise a base set of polygon vertices and the set of polygon vertices generated based on the surface relief meta-information is in addition to the base set of polygon vertices, e.g. both the base set of polygon vertices and the generated set of polygon vertices are processed to set the positions of the vertices. (It may be the case that it is determined that it is unnecessary to generate any polygon vertices, e.g. when the meta-information from the displacement map indicates that the surface relief for the region is flat. In this case the base set of polygon vertices, if any, which represent the region would simply be processed (e.g. displaced).)

Information representative of the surface relief of the (region of the) three-dimensional object to be rendered, e.g. a displacement map, (and, in an embodiment, the surface relief information from which the surface relief meta-information has been derived), is used to set the position of one or more of the vertices based on the surface relief of the region of the three-dimensional object to be rendered.

The vertex position setting process can be performed in any suitable and desired manner. For example the surface relief information can be used to set the vertex positions directly, e.g. the position attribute for the vertices may not be defined when the vertices are generated. However, in an embodiment the position of one or more of the vertices is modified based on information representative of the surface relief of the region of the region of the three-dimensional object, i.e. the vertices are generated with a position which is subsequently modified to a desired position that more accurately represents the surface relief of the region of the three-dimensional object being rendered.

In an embodiment, the information representative of the surface relief of the region of the three-dimensional object to be rendered is used to modify the positions of the vertices, and for example to displace one or more of the vertices by a distance determined from the information representative of the surface relief of the three-dimensional object. In an embodiment the displacement is in a direction along the surface normal at the vertex position in question, although other arrangements could, of course, be used (e.g. depending upon how the information representative of the surface relief of the object is defined (how it represents the surface relief)). The vertices could be displaced, e.g. using the displacement map, in any desired and suitable coordinate system, e.g. world space or tangent space, but in an embodiment the vertices are displaced in object space. This allows each object in the frame to be rendered to be dealt with separately before being combined into the final frame.

In an embodiment, the information representative of the surface relief of the three-dimensional object is sampled at positions corresponding to the positions of the vertices, and then the sampled surface relief information is used to set (e.g. displace) the vertex positions accordingly.

Thus, in an embodiment, the process of setting the positions of the vertices based on the information representative of the surface relief of the object comprises sampling, at points corresponding to each of the vertices, the information representative of the surface relief of the region of the three-dimensional object; and displacing, using the sampled information representative of the surface relief, each of the vertices.

In these arrangements, the information representative of the surface relief (e.g. displacement map), can be sampled as desired, e.g. by simply taking the nearest point in the, e.g. displacement map, for which a displacement measure is stored, or by using interpolation between data positions in the, e.g. displacement map, when required (e.g. by using bilinear filtering).

The information representative of the surface relief of the object (e.g. the displacement map) can be accessed and sampled in any suitable and desired manner and using any suitable and desired processing circuitry, stage or unit of the graphics processing pipeline. In an embodiment this information is accessed using a texturing unit (using texture mapping processes) of the graphics processing pipeline, e.g. via the processing circuitry.

In the embodiments in which the region (patch) of the three-dimensional object comprises a base set of polygon vertices, to which the generated set of polygon vertices are generated in addition, the first set of polygon vertices could be defined such that they require zero displacement (and the information indicating the surface relief, e.g. displacement map, may be configured to reflect this). However in an embodiment the base set of polygon vertices and the generated set of polygon vertices are considered together, with one or more vertices having their positions set (i.e. vertices in both the base and generated sets of polygon vertices may have their positions set), so as to more accurately reflect the surface relief of the object.

Once the polygon vertices have had their positions set by the information representative of the surface relief of the region of the three-dimensional object, the so-processed vertices can then be, and are in an embodiment, passed to the remainder of the graphics processing pipeline for processing (and processed in the normal manner to generate the desired graphics processing output, e.g. frame for display). In an embodiment this processing comprises, for example, assembling primitives using the vertices, and then rasterising the primitives to generate fragments representative of sampling positions in the render output for the primitives, and rendering the fragments to generate appropriate output sampling position data. In an embodiment the rendering process in this regard comprises, inter alia, a fragment shading operation.

Although the technology described herein has been described above with particular reference to the use of meta-information to determine the level of tessellation when processing regions of an object in a graphics processing pipeline, the Applicants have also recognised that the process of defining and providing surface relief information for objects to be processed in the graphics processing pipeline can itself be arranged in a manner that is advantageous both when performing tessellation in the manner of the technology described herein and otherwise.

In particular, the Applicants have recognised that when the information representative of the surface relief of the object, e.g. the displacement map, is stored as a set of separate data structures, e.g. displacement maps, e.g. each representing only some but not all of the frequency components of the information indicative of the surface relief of the object (e.g. of the overall displacement map), then that can be particularly advantageous when used in combination with embodiments of the method and pipeline of the technology described herein.

This is because when, e.g., the original, e.g., displacement map is encoded into multiple displacement maps, each containing different frequency components, and the meta-information used in embodiments of the technology described herein simply comprises a single frequency component, then the encoded displacement map containing the relevant frequency component can simply be selected for use to set the vertex positions. Thus it is then straightforward to determine from this frequency component the level of tessellation within the region of the object to use and thus the resolution at which to sample the displacement map.

Furthermore, as has been discussed above, the frequency components which are visible in the final displayed frame may change as the distance from the object and the angle of the viewer to the object's surface changes. This relationship between the distance or angle and the frequency components, for example, can be used to select which frequency component displacement map to use from the plurality of encoded displacement maps.

Thus, in an embodiment, the information indicative of the surface relief of the object that is used is stored and represented in a form such that respective frequency components of that information are stored in respective different data structures, and can be independently accessed and determined.

The Applicants further believe that such arrangements for representing surface relief information, e.g. displacement maps, may be useful in their own right, and not just in the context of embodiments of the technology described herein.

For example, the Applicants have recognised that lower frequency components of an, e.g. displacement map, can be sampled and stored at a lower resolution than the higher frequency component data without any (significant) loss of quality. This can then be used to facilitate storing the surface relief information, e.g. displacement maps, in a more efficient manner, and using less storage space, by storing the data for the lower frequency bands of the surface relief information at a lower resolution than the data for the higher frequency bands, rather than the entire surface relief information (e.g. displacement map) being sampled and stored at a resolution suitable for the highest frequency components.

In addition to this, where there is in fact no surface relief data for a given frequency band or bands, then there would be no need to store any data for those frequency bands, thereby again potentially reducing the storage space needed to store the encoded surface relief information (e.g. displacement map).

Thus, another embodiment of the technology described herein comprises a method of encoding data representing the surface relief of an object to be used in a graphics processing system, the method comprising:
  determining respective frequency components of the data representing the surface relief of the object; and
  generating and storing a plurality of data structures representative of the data representing the surface relief of the object, each data structure storing data representing a different respective set of the frequency components of the data representing the surface relief of the object.

Another embodiment of the technology described herein comprises an apparatus for encoding data representing the surface relief of an object to be used in a graphics processing system, the apparatus comprising processing circuitry configured to:
  determine respective frequency components of the data representing the surface relief of the object; and
  generate and store a plurality of data structures representative of the data representing the surface relief of the object, each data structure storing data representing a different respective set of the frequency components of the data representing the surface relief of the object.

As will be appreciated by those skilled in the art, these embodiments of the technology described herein can include any one or more or all of the optional features of the technology described herein, as appropriate.

Thus, in an embodiment the information indicative of the surface relief of the object comprises a displacement map and, in an embodiment, the process of encoding the displacement map comprises:
  expressing the data in the displacement map as a plurality of frequency components; and
  encoding respective sets of the frequency components as separate displacement maps.

Each data structure could relate to a single frequency component only, or to a set of plural frequency components (e.g. to a frequency "band"). In an embodiment no data structure is stored for those frequency components or bands that contain no data.

In an embodiment, the surface relief data is stored at different resolutions for different frequency components and/or bands. In an embodiment the resolution at which the frequency component data is stored (and, where appropriate, at which the surface relief data is sampled) is based on the frequency that the frequency component data relates to. In an embodiment the resolution at which the surface relief data is stored (and for example sampled) is lower for lower frequency components (bands) and higher for higher frequency components (bands).

The frequency components of the data representing the surface relief of the object can be determined as desired. In an embodiment data representing surface relief of the object (e.g. an initial "full" displacement map) is split into multiple frequency components, e.g. using a discrete cosine transform.

In an embodiment, a frequency component's value at a given sampling position is stored as the difference between the value stored at that particular point in the overall, e.g. displacement map, and the values stored for that position for the remainder of the frequency components, i.e. the sum of the frequency components (e.g. as cosine terms) gives the value stored in the original, overall, e.g. displacement map. Other arrangements would, of course, be possible.

This frequency component data, e.g. in the form of an encoded displacement map, can be used in other parts of the graphics processing pipeline, or exported to other components in the data processing system, as well as being used as described in the technology described herein.

The processing circuitry for the graphics processing pipeline can be implemented in any desired and suitable way, e.g. by one or more processing stages. In an embodiment the graphics processing pipeline comprises a first processing stage arranged to determine, based on the meta-information representative of the surface relief of the region of the three-dimensional object, whether to generate the set of polygon vertices over the region of the three-dimensional object, and to generate the set of polygon vertices over the region of the three-dimensional object, when this is deemed to be required. Thus the first processing stage will use the base set of polygon vertices, where provided, and the meta-information representative of the surface relief of the region of the three-dimensional object.

In an embodiment the graphics processing pipeline also comprises a second processing stage arranged to set the positions of one or more vertices in at least the set of polygon vertices based on information representative of the surface relief of the region of the region of the three-dimensional object. Thus the second processing stage will use the generated set of polygon vertices and the information representative of the surface relief of the region of the region of the three-dimensional object In an embodiment each processing stage for the implementation of the technology described herein, and therefore also the processing circuitry, comprises a shader. A shader is a programmable processing stage in a graphics processing pipeline which executes a shader program, e.g. to calculate a particular rendering effect in the rendering process. In an embodiment the first processing stage, i.e. the processing circuitry that determines and generates the polygon vertices, comprises a control or hull shader. In an embodiment the second processing stage, i.e. the processing circuitry that displaces the vertices, comprises an evaluation shader. In an embodiment the hull and evaluation shaders are positioned in the graphics processing pipeline after a vertex shader, which outputs vertices in a transformed coordinate system (where the transform may be an identity transformation). The transformed coordinate system is usually clip space, but other coordinate systems may be used. In an embodiment the evaluation shader follows the hull shader in the pipeline, but this is not essential. (It will be appreciated in this regard that the first and second processing stages of the technology described herein accordingly need not be (and typically will not be) the actual first and second processing stages of the graphics processing pipeline, and may be spaced from each other by other stages of the graphics processing pipeline.)

Subject to any hardware necessary to carry out the specific functions discussed above, the graphics processing pipeline can otherwise include any one or more or all of the usual functional units, etc., that graphics processing pipelines and processors include.

Thus, the graphics processing pipeline may also contain any other suitable and desired processing stages that a graphics processing pipeline may contain. In an embodiment, it includes, e.g. in this order, one or more of, and e.g. all of: a vertex shader, a hull shader, an evaluation shader, a geometry shader, a rasteriser, a fragment shader and a pixel processor and one or more tile buffers (in the case of tile-based rendering pipeline).

The processing circuitry and stages of the graphics processing pipeline may, e.g., be in the form of fixed-function units (hardware), or some or all of the functional units may be programmable (be provided by means of programmable circuitry that can be programmed to perform the desired operation). In an embodiment the graphics processing pipeline includes programmable "shaders" for performing desired vertex and/or fragment "shading" operations.

Each processing stage may be provided as a separate circuit element to other stages of the processing pipeline, or they may be at least partially formed of shared graphics processing circuitry.

In an embodiment the graphics processing pipeline also comprises, and/or is in communication with, one or more memories and/or memory devices that store the data described herein, and/or that store software for performing the processes described herein. The graphics processing pipeline may also be in communication with a host microprocessor, and/or with a display for displaying images based on the data generated by the graphics processing pipeline.

The technology described herein is applicable to any form or configuration of graphics processing pipeline and to all forms of rendering, such as immediate mode rendering, deferred mode rendering, tile-based rendering, etc. It is particularly applicable to graphics renderers that use deferred mode rendering and in particular to tile-based renderers.

Thus, in an embodiment graphics processing pipeline is a tile-based rendering pipeline. Thus, in an embodiment, the pipeline generates rendered fragment data in respect of (for) one or more individual tiles making up the overall output of the graphics processing operation (e.g. frame to be displayed).

The technology described herein can be used for all forms of output that a graphics processing pipeline may be used to generate, such as frames for display, render-to-texture outputs, etc.

It will be appreciated that as an output to be rendered by the graphics processing pipeline will typically be made up of plural objects (and tiles in a tile-based system), in practice the method of the technology described herein will be repeated for each object (and tile) making up the output, so that eventually an appropriate set of rendered fragment data has been generated for each sampling point of the output that is needed.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor.

It will also be appreciated by those skilled in the art that all of the described embodiments of the technology described herein can include, as appropriate, any one or more or all of the optional features described herein.

The methods of the technology described herein may be implemented at least partially using software, e.g. computer programs. It will thus be seen that embodiments of the technology described herein provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said graphics processor, renderer or microprocessor system to carry out the steps of the methods of the technology described herein. Such a computer software carrier could be a physical storage medium such as a flash memory, ROM chip, CD ROM, RAM or disk.

It will further be appreciated that not all steps of the methods of the technology described herein need be carried out by computer software and thus an embodiment of the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, flash memory, RAM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

As is known in the art, and as discussed above, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Figure 1:
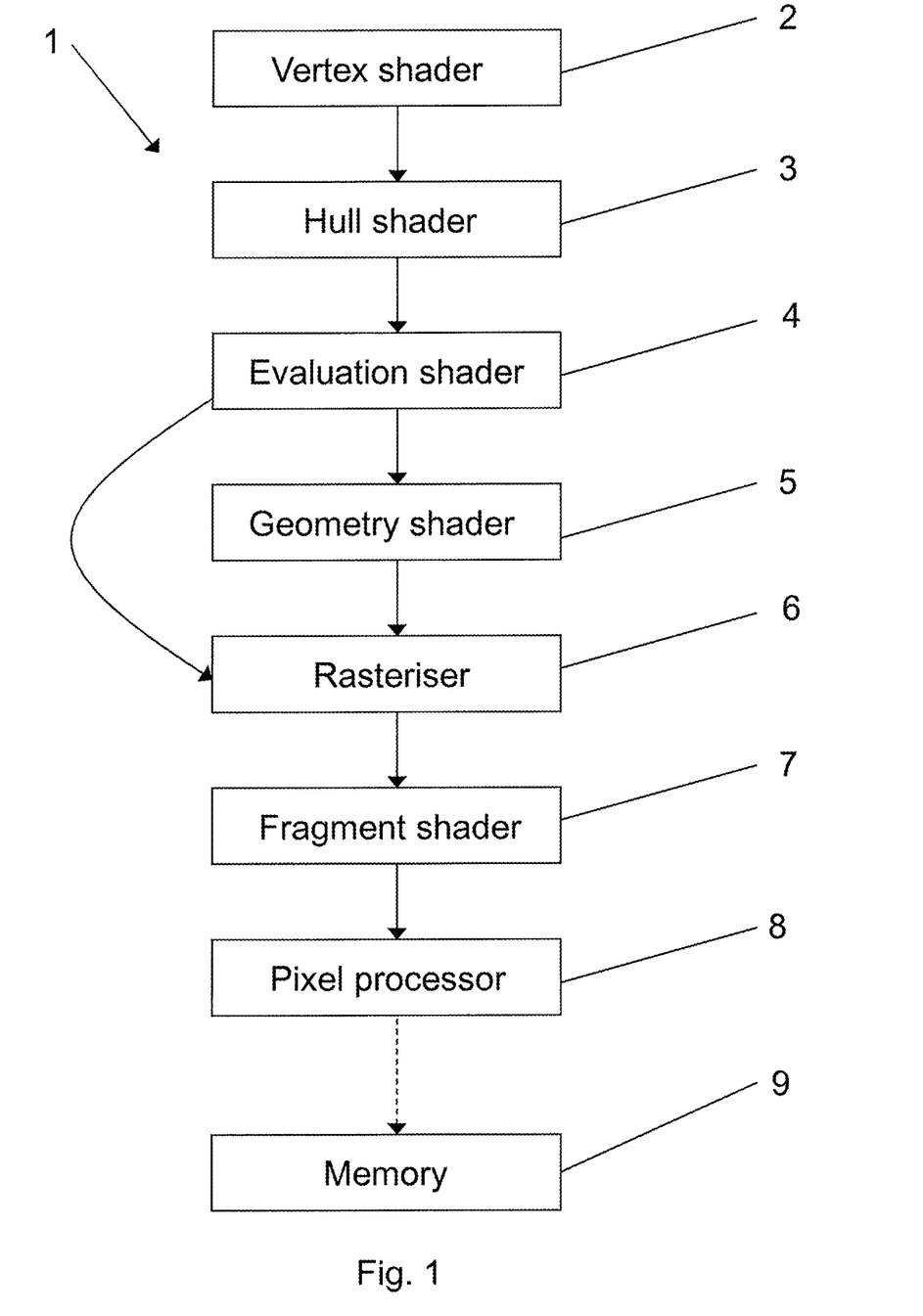
FIG. 1 shows a schematic an embodiment of a graphics processing pipeline.

FIG. 1 shows the main elements of the graphics processing system that are relevant to the operation of the technology described herein. As will be appreciated by those skilled in the art there may be other elements of the graphics processing system that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1.

The present embodiment is particularly concerned with the tessellation of primitives and the application of displacement maps in a graphics processing pipeline.

FIG. 1 shows, schematically, a graphics processing pipeline 1, which comprises part of a graphics processing system for rendering graphics images for display. The pipeline 1 comprises a sequence of different stages, known as "shaders" which each perform a different operation on the primitives making up the object to be displayed to prepare them for the final display.

First in the pipeline is a vertex shader 2 which vertex shades the vertices for the output being generated and passes the vertex shaded vertices to a hull shader 3. The hull shader 3 performs, inter alia, a tessellation operation (this will be discussed further below).

An evaluation shader 4 which, inter alia, "displaces" vertices generated by the tessellation operation of the hull shader 3 follows the hull shader 3. There is then an optional geometry shader 5.

A rasteriser 6 takes the output of the geometry shader 5 (if used), or the output of the evaluation shader 4, and generates graphics fragments for rendering. The graphics fragments generated by the rasteriser 6 are then rendered (shaded) by a fragment shader 7. Finally a pixel processor 8 processes the output from the fragment shader 7, e.g. downsamples it to resolve the fragments to the final pixels, and the final output is, e.g., written out to main memory 9, e.g. for subsequent display, e.g. on a screen.

The function of each of these shaders in FIG. 1 in the present embodiment will be described in more detail below, with reference to FIG. 2 which shows a flow chart detailing the main operational steps of a graphics processing pipeline of an embodiment of the technology described herein.

When the graphics processing pipeline 1 is to produce a desired output, such as a frame to be displayed, the required graphics processing (e.g. frame) will, as is known in the art, be processed as one or more "draw calls". Each draw call will include one or more graphics objects to be processed. FIG. 2 shows the sequence of operations for a given draw call for a graphics processing output (e.g. frame to be displayed), and so accordingly starts at the point where the next draw call's processing is started (step 11, FIG. 2).

For each draw call, a respective set of vertex data 30 which defines vertices to be used for the draw call is defined. In the present embodiments each object to be processed is represented by one or more "patches" which each represent a region of the object in question, with the respective patches each being defined and having associated with them a respective set of vertices of the draw call that, e.g., define the corners of the respective patches. The patches are typically in the form of simple polygons such as triangles or quadrilaterals.

Figure 3A:
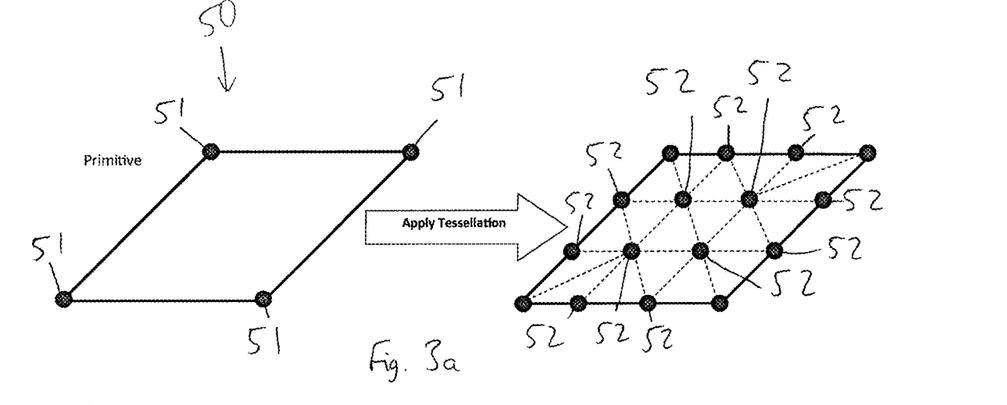
FIG. 3a shows schematically an embodiment of the step of tessellating a primitive.

FIG. 3a shows schematically a patch 50 of an object to be rendered in the form of a quadrilateral region of the surface of an object, with a vertex 51 at each corner of the quadrilateral. Other patch configurations would, of course, be possible. For example, the patch could be defined with more or fewer vertices.

Figure 2:
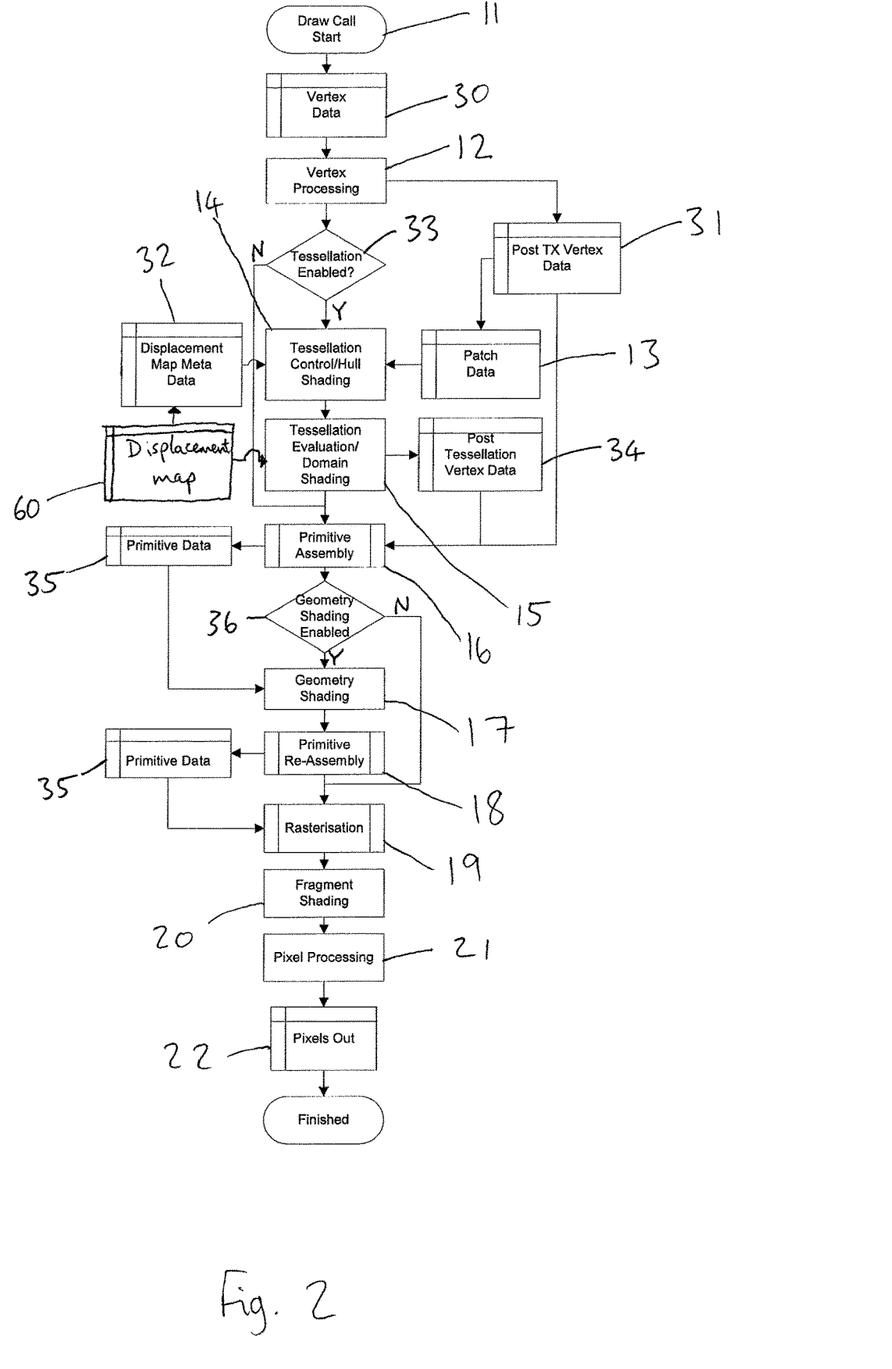
FIG. 2 shows a flow chart detailing the operational steps of the graphics processing pipeline of FIG. 1.

The vertex data 30 for the draw call is processed by the vertex shader 2 to transform the virtual three-dimensional positions of the vertices to their two-dimensional positions in screen space (step 12, FIG. 2). Once the vertices have been processed, this processed vertex data 31 is grouped into the patches (step 13, FIG. 2) which represent the regions of the objects to be displayed.

Once the vertex processing has been completed, it is then determined whether tessellation has been enabled for the draw call (step 33, FIG. 2). When tessellation has not been enabled, the processing proceeds directly to the primitive assembly stage (step 16, FIG. 2).

However, for the purposes of the present description, it will be assumed that tessellation has been enabled. In this case, the next stage in the processing is to carry out tessellation control/hull shading (step 14, FIG. 2) in the hull shader 3.

The inputs to this tessellation control/hull shading stage are the patch data 13 indicating the patches of the objects to be processed for the draw call, and displacement map meta-data 32.

Figure 3B:
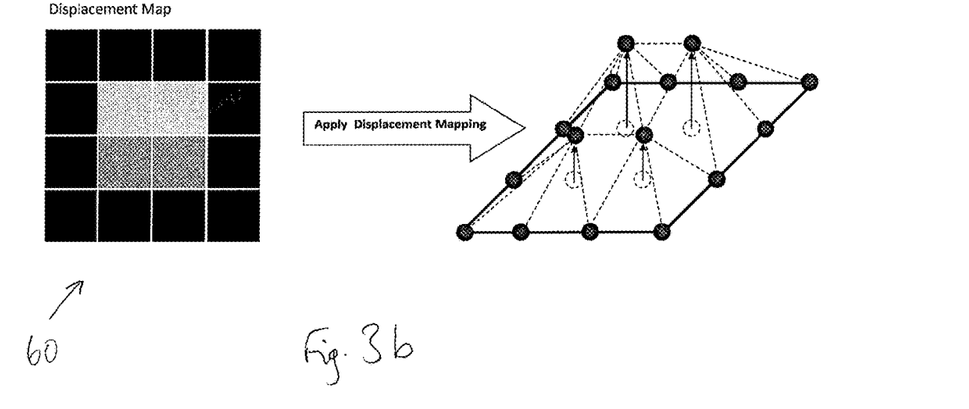
FIG. 3b shows schematically an embodiment of the step of applying a displacement map to a set of vertices.

The displacement map meta-data 32 is derived from a displacement map created to describe the surface relief of the object being rendered (to which the patch in question relates). An example of a simple displacement map 60 is shown in FIG. 3b. Displacement maps are data structures within graphics processing systems and comprise a two-dimensional representation of the surface of the three-dimensional object, with a measure at a plurality of points, e.g. stored as a value, by which to displace the surface of the object. The measures can be provided at discrete points or by a continuous function.

In FIG. 3b, the measures on the displacement map 60 are represented graphically at sixteen points across a 4×4 grid by a grayscale, with lighter shades indicating larger displacements. The measures stored for each of the sixteen points comprises a vector (x, y, z) which defines the distance and the direction of the displacement in object space (the coordinate system of the object being rendered), i.e. when this point on the displacement is sampled, the corresponding vertex on the object being displayed is displaced by the vector. The displacement map 60 is constructed using a digital content creation (DCC) tool to strip the surface relief geometry from a complex geometric model of a three-dimensional object into a two-dimensional map.

The meta-data 32 comprises a measure of the frequency components in the displacement map which are determined using a discrete cosine transform (DCT) of the displacement map 60.

The hull shader 3 uses the meta-data 32 to determine whether and to what extent to tessellate additional vertices and primitives within each patch 50, i.e. whether to create additional polygon vertices 52 within the patch 50 (step 14, FIG. 2), as shown in FIG. 3a (this includes generating additional polygon vertices 52 along the edges of the patch 50).

For example, when the displacement map 60 contains high frequency components indicating that the surface relief of the object is very detailed then the hull shader 3 will decide to generate a number of additional polygon vertices 52 within the patch 50, whereas when the displacement map 60 contains only low frequency components indicating a flat surface relief, then the hull shader 3 may decide not to generate any additional polygon vertices.

The hull shader 3 then generates the additional polygon vertices 52 (step 14, FIG. 2) (if any) as is shown in FIG. 3a, to tessellate within the patch 50. The number of additional polygon vertices 52 generated is proportional to the highest frequency component extracted from the displacement map 60 which is visible. The hull shader 3 determines the highest frequency component which is visible by using the distance of the object from the camera (view point) and the angle of the surface to the camera (view point).

Once the additional polygon vertices 52 have been generated, they are passed to the evaluation shader 4. The evaluation shader 4 receives the displacement map 60 as an input and uses it to displace the positions of the both the original and additional polygon vertices 52 (step 15, FIG. 2), as shown in FIG. 3b by the vector (x,y,z) stored at the corresponding sampling point on the displacement map, to generate post-tessellation vertex data 34 (though as shown in FIG. 3b the displacement measures stored in the displacement map that correspond to the original polygon vertices are zero, so these vertices remain at their original position in this example).

The displacement operation can be performed as desired, e.g. by summation of the vertex with the displacement factor (vector). It may also include, e.g., magnification of the displacement (to exaggerate features), weighted blending/filtering of several samples from the displacement map, and/or animation, etc., when desired.

The post-tessellation vertex data 34, i.e. with the additional polygon vertices displaced to their new positions, is then passed to the next stage of the graphics processing pipeline in order to render the object for output.

Following the application of the displacement map 60 to the additional polygon vertices 52 by the evaluation shader 4, the primitives which will make up and be processed for the region of object in question are assembled (step 16, FIG. 2), using the post-tessellation vertex data 34 and the post-vertex shading vertex data 31. The "assembled" primitive data 35 is then stored.

When geometry shading is enabled (step 36, FIG. 2), the geometry shader takes the primitive data 35 and creates new geometry (primitives) when necessary (step 17, FIG. 2).

When additional primitives are created by the geometry shader 5 they are re-assembled (step 18, FIG. 2), with all the resultant primitives, e.g. no additional primitives when the geometry shader has not been used, being passed to the rasteriser 6 for rasterisation (step 19, FIG. 2).

The rasterising process determines the sample positions that should be used for a primitive (i.e. the (x, y) positions of the sample points to be used to represent the primitive in the output, e.g. frame to be displayed).

The rasterisation stage 6 of the graphics processing pipeline operates to rasterise the primitives making up the render output (e.g. the frame to be displayed) into individual graphics fragments for processing. To do this, the rasteriser 6 receives graphics primitives for rendering, rasterises the primitives to sampling points and generates graphics fragments having appropriate positions (representing appropriate sampling positions) for rendering the primitives. The fragments generated by the rasteriser are then sent onwards to the rest of the pipeline for processing.

The graphics fragments generated by the rasteriser 6 are passed to the fragment shader 7 for rendering (shading) (step 20, FIG. 2). The output of the fragment shading stage is, e.g., a set of, e.g., colour values for each sampling position representing the region of the output in question.

The rendered sampling positions from the fragment shading stage are then processed by a pixel processor 8 to, e.g., downsample the rendered sampling positions to provide rendered pixel data for the pixels that will actually be output (e.g. displayed) (step 21, FIG. 2). The pixel data may then, e.g., be output to main memory (e.g. a frame buffer) for display (step 22, FIG. 2).

In these embodiments of the graphics processing pipeline, meta-data derived from a displacement map is used to determine the level of tessellation to be provided in a particular area over the surface of the object, appreciating that often the surface relief detail of a given object is not uniform (either owing to the inherent detail of the object, or the distance or angle different parts of the object are from the camera position (view point)). When the surface relief of the object is complex with lots of detail to display, the hull shader will generate further vertices which can then be displaced by the evaluation shader using the displacement map. Conversely, when the surface relief is devoid of features, little or even no tessellation of the existing patches will be necessary, thus minimising the processing and bandwidth needed for that particular region of the object.

By using an appropriate level of tessellation for an object to be rendered, the known problems of popping and over-tessellation are avoided, and the benefits of using actual displacement of the surface are afforded, e.g. correct handling of shadows.

Figure 4:
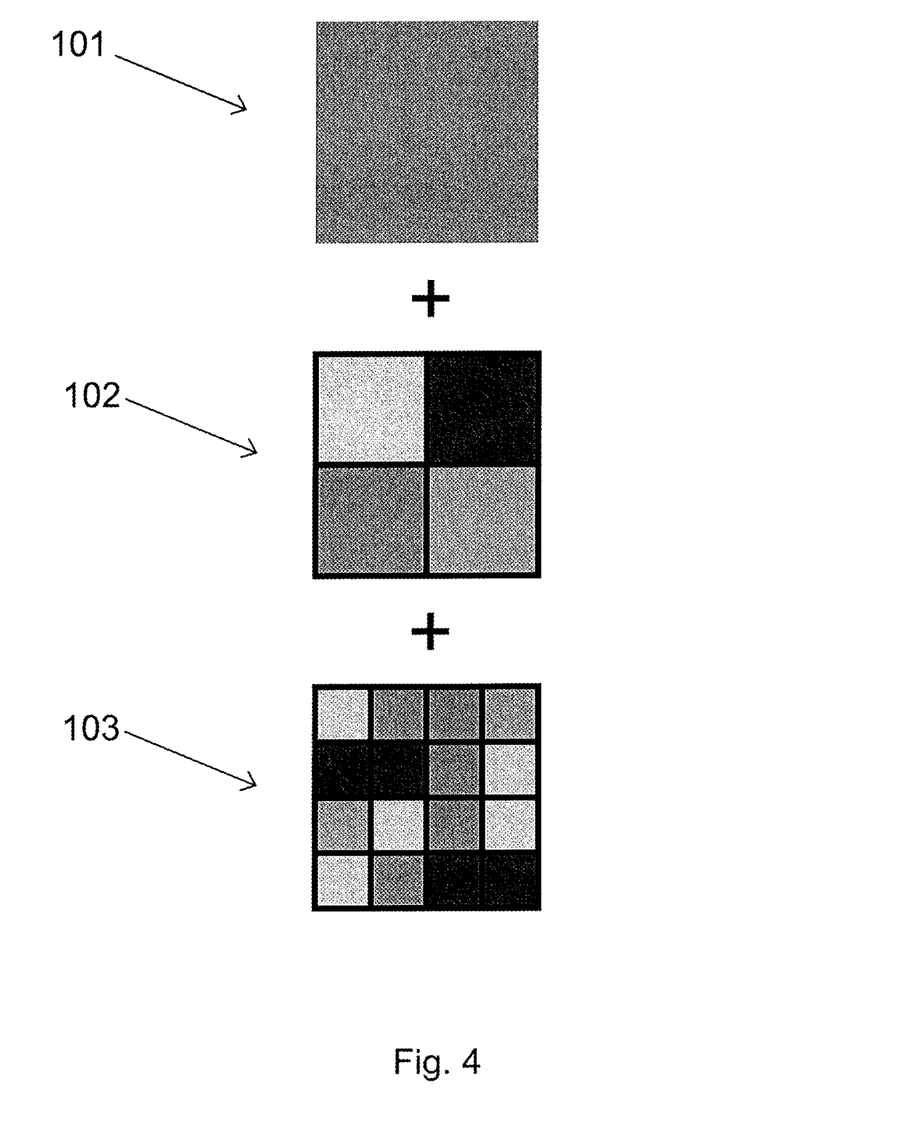
FIG. 4 shows schematically an encoded displacement map.

An example embodiment of a method for encoding displacement maps will now be described with reference to FIG. 4. FIG. 4 shows how a displacement map can be encoded in an embodiment of the technology described herein.

The encoded displacement map comprises the three displacement maps 101, 102, 103 shown schematically in FIG. 4. The displacement maps in FIG. 4 are similar to the one shown in FIG. 3b in that they are represented graphically at a number of points across a grid by a grayscale, with lighter shades indicating larger displacements. The summed contribution of each individual displacement map 101, 102, 103 gives the total measure given by the displacement map being encoded.

Each of the displacement maps 101, 102, 103 shown in FIG. 4 represents a different frequency component of the displacement map being encoded, such that the measure stored at each point of the displacement maps 101, 102, 103 indicates the coefficient of the particular frequency component in that map.

The upper displacement map 101 contains only a single measure across the area of the whole displacement map. The upper displacement map 101 is representative of the lowest frequency in the displacement map which, owing to its frequency, indicates the contribution of a relatively slowly changing gradient component across the displacement map. It is therefore sufficient to encode this contribution at only a single point for the whole of the displacement map.

The middle displacement map 102 contains four points in a 2×2 grid which are representative of a higher frequency than represented in the upper displacement map 101, e.g. double the frequency. The middle displacement map 102 indicates the contributions of a more rapidly changing gradient component across the displacement map, which therefore requires four points to encode this contribution.

The lower displacement map 103 contains sixteen points in a 4×4 grid which are representative of the highest frequency component in the displacement map being encoded, e.g. quadruple the frequency of that represented by the upper displacement map 101. The lower displacement map 103 indicates the contributions of the most rapidly changing gradient component across the displacement map and therefore requires the most points (sixteen) to encode this contribution.

To produce the encoded displacement maps 101, 102, 103 the original displacement map, e.g. as shown in FIG. 3b, is expressed as a sum of its component parts over the original displacement map. This is done using a discrete cosine transform to determine the component parts as individual frequency components. The coefficients of each frequency component can then be separated into separate encoded displacement maps 101, 102, 103 such that each encoded displacement map 101, 102, 103 represents the coefficients for a single frequency component.

It can be seen from the above that in an embodiment, the encoded displacement maps can be used easily to provide meta-information, e.g. individual frequency components, for processing stages of a graphics processing pipeline in order to determine the level of tessellation to use. Furthermore, encoding the displacement map in this way enables lower frequency components to be stored at a lower resolution, thus reducing the storage space needed for the encoded displacement map. Also, when a particular encoded displacement map contains no contributions from its frequency component, then it is not necessary to store this at all, further reducing the storage space.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of generating a set of polygon vertices over a region of a three-dimensional object in a graphics processing pipeline, the method comprising:
    determining, from information representative of the surface relief of the region of the three-dimensional object, meta-information representative of the surface relief of the region of the three-dimensional object, wherein the meta-information comprises a plurality of values corresponding to one or more points over the region of the three-dimensional object, wherein at each of the one or more points the meta-information comprises plural values, each of the plural values representative of respective, different frequency components of a plurality of frequency components that are representative of and derived from the surface relief of the region of the three-dimensional object;
    determining, based on the plural values representative of the plurality of frequency components at each of one or more points over the region of the three-dimensional object, whether to generate a set of polygon vertices over the region of the three-dimensional object;
    generating the set of polygon vertices over the region of the three-dimensional object, when this is determined to be required, wherein the number of polygon vertices generated in the set of polygon vertices depend on the plural values representative of the plurality of frequency components at each of the one or more points over the region of the three-dimensional object; and
    setting the positions of one or more vertices in the set of polygon vertices based on the information representative of the surface relief of the region of the three-dimensional object.

2. A method as claimed in claim 1, wherein the one or more frequency components are weighted, with the weights depending on one or more of: the viewing distance and the viewing angle for the object.

3. A method as claimed in claim 1, wherein the number of vertices generated in the set of polygon vertices depends on one or more of: the viewing distance and the viewing angle for the object.

4. A method as claimed in claim 1, wherein the graphics processing pipeline comprises:
    a hull shader arranged to determine, based on the meta-information representative of the surface relief of the region of the three-dimensional object, whether to generate the set of polygon vertices over the region of the three-dimensional object, and to generate the set of polygon vertices over the region of the three-dimensional object, when this is deemed to be required; and
    an evaluation shader arranged to set the positions of one or more vertices in at least the set of polygon vertices based on information representative of the surface relief of the region of the region of the three-dimensional object.

5. The method as claimed in claim 1, wherein the number of polygon vertices to be generated is determined using two or more of the plurality of frequency components at each of one or more points over the region of the three-dimensional object.

6. A graphics processing pipeline, the graphics processing pipeline comprising processing circuitry operable to generate sets of polygon vertices over regions of three-dimensional objects being processed by the graphics processing pipeline, wherein the processing circuitry operable to generate sets of polygon vertices over regions of three-dimensional objects being processed by the graphics processing pipeline is capable of:
determining, from information representative of the surface relief of the region of the three-dimensional object, meta-information representative of the surface relief of the region of the three-dimensional object, wherein the meta-information comprises a plurality of values corresponding to one or more points over the region of the three-dimensional object, wherein at each of the one or more points the meta-information comprises plural values, each of the plural values representative of respective, different frequency components of a plurality of frequency components that are representative of and derived from the surface relief of the region of the three-dimensional object;
determining, based on the plural values representative of the plurality of frequency components at each of one or more points over the region of the three-dimensional object, whether to generate a set of polygon vertices over the region of the three-dimensional object;
generating the set of polygon vertices over the region of the three-dimensional object, when this is deemed to be required, wherein the number of polygon vertices generated in the set of polygon vertices depends on the plural values representative of the plurality of frequency components at each of the one or more points over the region of the three-dimensional object; and
setting the positions of one or more vertices in the set of polygon vertices based on the information representative of the surface relief of the region of the region of the three-dimensional object.

7. A graphics processing pipeline as claimed in claim 6, wherein the one or more frequency components are weighted, with the weights depending on one or more of: the viewing distance and the viewing angle for the object.

8. A graphics processing pipeline as claimed in claim 6, wherein the processing circuitry is capable of generating the number of vertices in the set of polygon vertices dependent upon one or more of: the viewing distance and the viewing angle for the object.

9. A graphics processing pipeline as claimed in claim 6, wherein the processing circuitry comprises:
a hull shader capable of determining, based on the meta-information representative of the surface relief of the region of the three-dimensional object, whether to generate the set of polygon vertices over the region of the three-dimensional object, and generating the set of polygon vertices over the region of the three-dimensional object, when this is deemed to be required; and
an evaluation shader capable of modifying the positions of one or more vertices in at least the set of polygon vertices based on information representative of the surface relief of the region of the region of the three-dimensional object.

10. The graphics processing pipeline as claimed in claim 6, wherein the number of polygon vertices to be generated is determined using two or more of the plurality of frequency components at each of one or more points over the region of the three-dimensional object.

11. A non-transitory computer readable storage medium storing computer software code which when executing on a processor performs a method of generating a set of polygon vertices over a region of a three-dimensional object in a graphics processing pipeline, the method comprising:
determining, from information representative of the surface relief of the region of the three-dimensional object, meta-information representative of the surface relief of the region of the three-dimensional object, wherein the meta-information comprises a plurality of values corresponding to one or more points over the region of the three-dimensional object, wherein at each of the one or more points the meta-information comprises plural values, each of the plural values representative of respective, different frequency components of a plurality of frequency components that are representative of and derived from the surface relief of the region of the three-dimensional object;
determining, based on the plural values representative of the plurality of frequency components at each of one or more points over the region of the three-dimensional object, whether to generate a set of polygon vertices over the region of the three-dimensional object;
generating the set of polygon vertices over the region of the three-dimensional object, when this is determined to be required, wherein the number of polygon vertices generated in the set of polygon vertices depends on the plural values representative of the plurality of frequency components at each of the one or more points over the region of the three-dimensional object; and
setting the positions of one or more vertices in the set of polygon vertices based on the information representative of the surface relief of the region of the three-dimensional object.

12. A method of encoding data representing the surface relief over a region of an object to be used in a graphics processing system, the method comprising:
expressing the data representing the surface relief over the region of the object as a plurality of frequency components, wherein the data representing the surface relief comprises a displacement map, each frequency component is determined at one or more points over the region of the object and at each of the one or more points the data is expressed as the plurality of the frequency components; and
generating and storing in a memory a plurality of data structures for use in a graphics processing system, wherein the plurality of data structures are representative of the data representing the surface relief over the region of the object, each data structure storing, for the region of the object, data representing a different respective set of the plurality of frequency components that have been determined from the data representing the surface relief over the region of the object, wherein the data representing each of the plurality of frequency components comprises the coefficient of the respective frequency component in the displacement map, and wherein each data structure stores, for one or more points over the region of the object, the data representing the different respective set of the plurality of frequency components of the data at each of the one or more points over the region of the object at a resolution that is based on the frequency that the frequency components of the data relate to.

13. An apparatus for encoding data representing the surface relief over a region of an object to be used in a graphics processing system, the apparatus comprising processing circuitry capable of:
expressing the data representing the surface relief over the region of the object as a plurality of frequency components, wherein the data representing the surface relief comprises a displacement map, each frequency component is determined at one or more points over the region of the object and at each of the one or more points the data is expressed as the plurality of the frequency components; and generating and storing in a memory a plurality of data structures for use in a graphics processing system, wherein the plurality of data structures are representative of the data representing the surface relief over the region of the object, each data structure storing, for the region of the object, data representing a different respective set of the plurality of frequency components that have been determined from the data representing the surface relief over the region of the object, wherein the data representing each of the plurality of frequency components comprises the coefficient of the respective frequency component in the displacement map, and wherein each data structure stores, for one or more points over the region of the object, the data representing the different respective set of the plurality of frequency components of the data at each of the one or more points over the region of the object at a resolution that is based on the frequency that the frequency components of the data relate to.

14. A non-transitory computer readable storage medium storing computer software code which when executing on a processor performs a method of encoding data representing the surface relief over a region of an object to be used in a graphics processing system, the method comprising:

expressing the data representing the surface relief over the region of the object as a plurality of frequency components, wherein the data representing the surface relief comprises a displacement map, each frequency component is determined at one or more points over the region of the object and at each of the one or more points the data is expressed as the plurality of the frequency components; and generating and storing in a memory a plurality of data structures for use in a graphics processing system, wherein the plurality of data structures are representative of the data representing the surface relief over the region of the object, each data structure storing, for the region of the object, data representing a different respective set of the plurality of frequency components that have been determined from the data representing the surface relief over the region of the object, wherein the data representing each of the plurality of frequency components comprises the coefficient of the respective frequency component in the displacement map, and wherein each data structure stores, for the one or more points over region of the object, the data representing the different respective set of the plurality of frequency components of the data at each of the one or more points over the region of the object at a resolution that is based on the frequency that the frequency components of the data relate to.

* * * * *

UNITED STATES PATENT AND TRADEMARK OFFICE
CERTIFICATE OF CORRECTION

PATENT NO. : 10,089,782 B2
APPLICATION NO. : 14/717850
DATED : October 2, 2018
INVENTOR(S) : Plowman et al.

Page 1 of 1

It is certified that error appears in the above-identified patent and that said Letters Patent is hereby corrected as shown below:

In the Claims

Column 20, Claim 4, Line 13: Change "of the region of the region" to -- of the region --.

Column 21, Claim 6, Line 33: Change "of the region of the region" to -- of the region --.

Column 21, Claim 9, Line 56: Change "of the region of the region" to -- of the region --.

Signed and Sealed this
Fourth Day of December, 2018

Andrei Iancu
*Director of the United States Patent and Trademark Office*